US005491878A

United States Patent [19]
Janouschek

[11] Patent Number: 5,491,878
[45] Date of Patent: Feb. 20, 1996

[54] EYEGLASS HOLDER

[76] Inventor: Heinz Janouschek, Riethaldenstrasse 2, 8266 Steckborn, Switzerland

[21] Appl. No.: 256,819

[22] Filed: Jul. 25, 1994

[30] Foreign Application Priority Data

Nov. 26, 1992 [CH] Switzerland .................. 3623/92

[51] Int. Cl.[6] .................. A44B 21/00; A47F 5/00
[52] U.S. Cl. .................. 24/3.3; 248/902
[58] Field of Search .................. 24/3 C, 3 E, 3 F, 24/3 G, 3 L, 10 R, 564, 546; 211/13; 248/902; 224/247, 248, 252, 269; 206/5 R; 351/155, 158

[56] References Cited

U.S. PATENT DOCUMENTS

| | | |
|---|---|---|
| 1,335,333 | 3/1920 | Hanson . |
| 1,336,083 | 4/1920 | Kranz . |
| 1,409,840 | 3/1922 | Evans . |
| 3,157,927 | 11/1964 | Roden .................. 224/248 X |
| 3,508,691 | 4/1970 | Langbehn .................. 224/248 |
| 3,760,459 | 9/1973 | Miles .................. 24/34 |
| 4,065,040 | 12/1977 | Steere .................. 224/248 |
| 4,695,026 | 9/1987 | Medley, Jr. .................. 248/902 X |
| 4,715,575 | 12/1987 | Kamerer .................. 211/13 X |
| 4,946,125 | 8/1990 | McCarty .................. 248/902 X |
| 5,033,612 | 7/1991 | Bivins .................. 24/3 G X |

*Primary Examiner*—Peter M. Cuomo
*Assistant Examiner*—Robert J. Sandy
*Attorney, Agent, or Firm*—Martin A. Farber

[57] ABSTRACT

An eyeglass holder having a cross-shaped clip (305) on which two shaped parts (341) are fastened for holding the eyeglasses fast and clamping the eyeglass holder (301) firmly on the breast pocket of an article of clothing (317). The shaped parts (341) can be pushed over the ends (312) of the beam (309) and adapted to the size of the eyeglasses to be held. On the vertical beam (307) there is fastened a holding part (308) by which the eyeglass holder (301) can be fastened to the breast pocket or another part of an article of clothing.

17 Claims, 4 Drawing Sheets

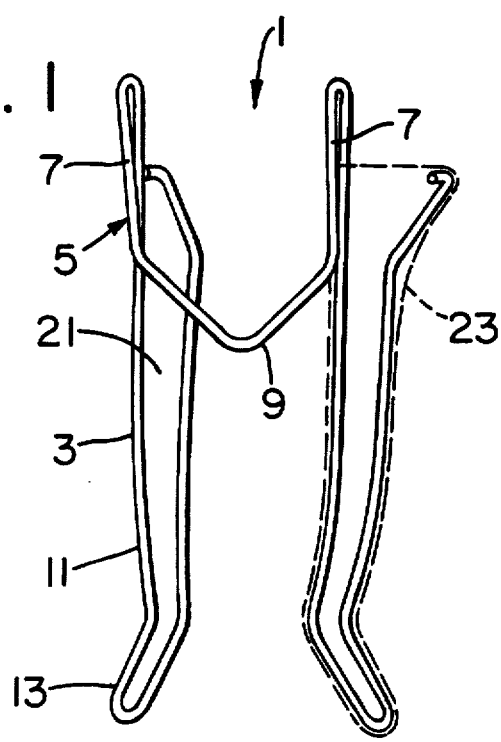
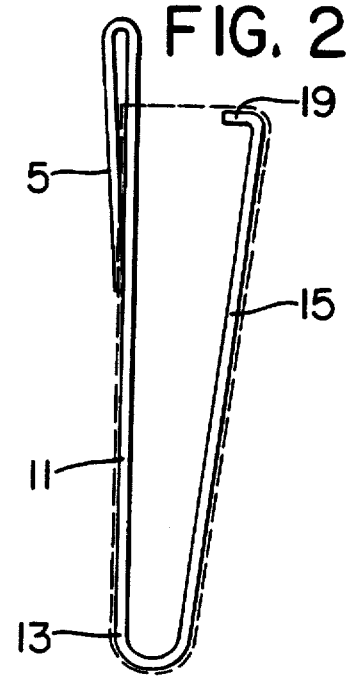
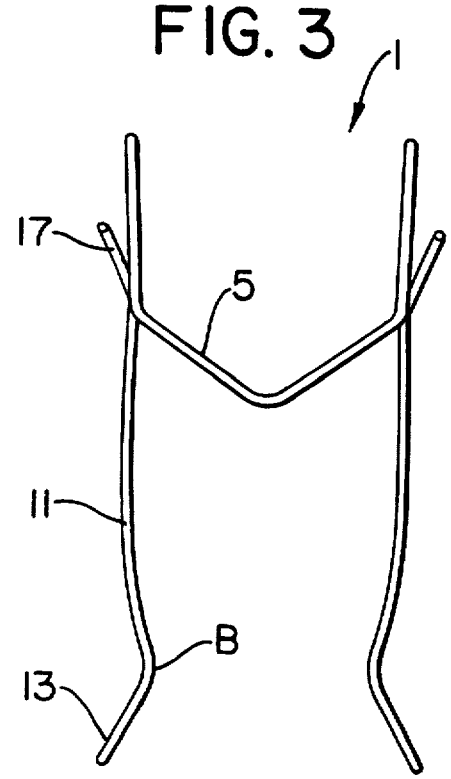
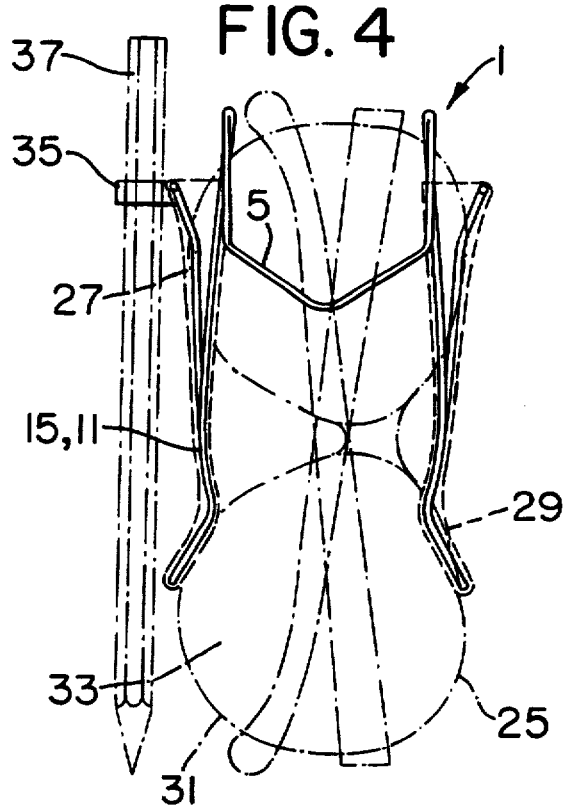

EYEGLASS HOLDER

FIELD AND BACKGROUND OF THE INVENTION

The present invention relates to an eyeglass holder.

Persons who have to wear eyeglasses merely for reading, merely for distance vision, or as protection when working or in sports, frequently keep their glasses in the breast pocket of their shirt or work clothes. When a person who keeps his glasses loose in his breast pocket, which is open on top, bends down, the eyeglasses can drop out and break or be lost. This can happen several times a day in a workshop where the workers must frequently bend down in order to pick up articles.

From U.S. Pat. No. 5,033,612, an eyeglass holder is known which can be fastened by a safety pin to an article of clothing. The eyeglass holder has a central opening through which one of the temple pieces of the eyeglasses can be passed and is prevented from sliding laterally by a sleeve-shaped guide on its rear. This known eyeglass holder has the disadvantage that the eyeglasses are held in a freely swinging manner suspended from one of the holders on the chest of the eyeglass wearer. The eyeglasses are completely unprotected and interfere with the person carrying them upon any movement.

From U.S. Pat. 1,409,840, an eyeglass case is furthermore known which can be attached by a clip to an article of clothing. The eyeglasses can be inserted in the case through its open top. The disadvantage of this eyeglass holder is that dirt can collect in the case and then be transferred to the lenses when the eyeglasses are inserted therein, thereby dirtying or scratching them. Furthermore, the eyeglasses are not held firmly in the case and drop out of it when the wearer bends down.

SUMMARY OF THE INVENTION

The object of the present invention is to provide an eyeglass holder which holds the eyeglasses securely, in protected fashion, within a pocket of an article of clothing or of a sport tube or handbag.

Surprisingly, it is possible with the eyeglass holder of the invention to carry the eyeglasses at the customary place in the breast pocket of a shirt or in the breast pocket or side pocket of work clothes and to hold it fast in such a manner that it cannot slip out upon bending down, but can nevertheless be easily removed for use. The eyeglasses are held only along their frame; the lenses do not come in contact with the eyeglass holder and therefore the lenses cannot be dirtied or scratched. Due to the fact that the eyeglasses are carried within the pocket, they cannot slide out upon bending down and are also not dirtied by external effects. The elastic development and/or adjustability of the two guide surfaces which hold the eyeglasses makes it possible to introduce eyeglasses of different size into one and the same holder. The eyeglass holder is made of spring steel, plastic, stamped metal, or a combination of these materials. Its weight is accordingly minimal and scarcely perceptible to the wearer. Manufacture of the eyeglass holder is inexpensive since it consists only of bent wire, of extruded plastic or stamped metal parts and of two elastic elements which form the guide surfaces, for instance a sleeve, a tube or shaped parts. The shaped parts can be sewn, bonded, or sprayed.

BRIEF DESCRIPTION OF THE DRAWINGS

With the above and other advantages in view, the present invention will become more clearly understood in connection with the detailed description of preferred embodiments, when considered with the accompanied drawings, of which:

FIG. 1 is a perspective view of the wire frame forming the eyeglass holder of the first embodiment, seen from the rear;

FIG. 2 is a side view of the eyeglass holder of FIG. 1;

FIG. 3 is a front view thereof;

FIG. 4 shows the eyeglass holder from the front with eyeglasses inserted therein;

DETAILED DESCRIPTION OF THE PREFERRED EMBODIMENTS

Figure 5:
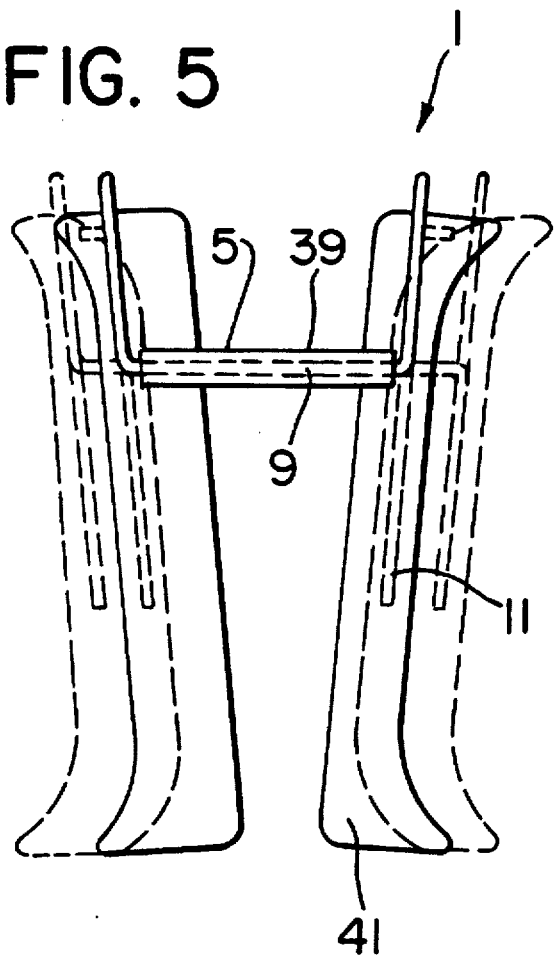
FIG. 5 is a front view of an adjustable eyeglass holder.

The eyeglass holder, designated by the reference numeral 1, consists, in the first embodiment of the invention, of a single wire 3 which has several bends and preferably has a shape of mirror symmetry with respect to the vertical. The upper part of the clip 5, which part forms the frame of the eyeglass holder 1, is formed of two vertical sections 7 and two sections adjoining the vertical sections 7 at their bottom and representing a V, a hook 9. The upper ends of the sections 7 are bent over in forward direction with a narrow radius by an angle of 180° and the two arms 11 which adjoin them extend, as seen in side view (FIG. 2), approximately straight downward. In front view (FIGS. 3 and 4), the front arms 11 extend first of all substantially vertically and then approach each other up to the place B whereupon they again extend outward. The lowermost outward-extending part 13 of the arms 11 has a length which amounts to only a fraction, for instance one-fifth, of the upper section of the arm 11.

Parallel to arm 11 there is the clamping arm 15 which lies directly in front of the arm 11 in FIGS. 3 and 4 and, as seen in side view in FIG. 2, moves away upwards from the arm 11. The upper end of the clamping arm 15 extends, as seen in the front view (FIG. 3), with greater inclination towards the outside in the uppermost region 17 and terminates at the end 19 which is bent off substantially at a right angle. The bent end 19 extends towards the clip 5 as seen in the side view of the FIG. 2.

The holding part 9 with its lower part 13, which connects the front arm 11 and the clamping arm 15 to each other, can be developed in U or V shape together with the lower part of the clamping arm 15.

The two lower sections or the sections 7 of the holding part 9 lie under initial stress against the front two arms 11.

The front arm 11 and the clamping arm 15 which is connected to it by the lower part 13 form the frame for an elastically developed plastic shaped part 21 which is formed by a sleeve, a tube which is pushed from below over the front arm 11 and the clamping arm 15 which is connected to it (the sleeve 23 is shown in dashed lines in FIGS. 1, 2 and 4).

The sleeve 23 consists preferably of sheetlike material which has been produced by extrusion, by sewing, bonding or welding of a sheetlike textile structure. The sheetlike material can be woven or knitted or be produced by extrusion. The inner width of the sleeve 23 is somewhat less than the distance between the front arm 11 and the clamping arm 15 in the region of the end 19. In this way, the clamping arm 15 is bent towards the front arm 11 and holds the sleeve 23 which has been pushed over the two parts taut. The plastic shaped part 21, i.e. the receiver for the eyeglasses, which is located between the parts 11 and 15, has preferably an S-shaped course on the inside.

Figure 6:
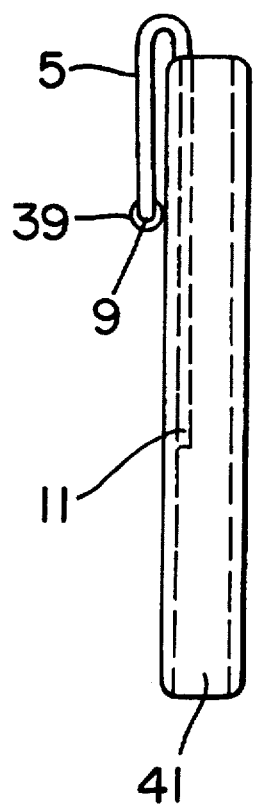
FIG. 6 is a side view of the eyeglass holder of FIG. 5.
Figure 7:
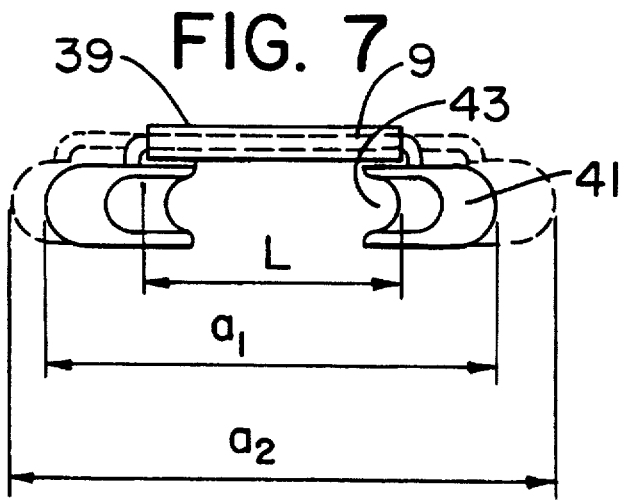
FIG. 7 is a top view of the eyeglass holder of FIG. 5.

In the second embodiment of the invention, seen in FIGS. 5 to 7 which show an eyeglass holder 1 which is furthermore adjustable and displaceable in width and is intended for large and small eyeglasses 25, an intermediate part 39 is inserted on the clip 5 in the region of the holding part 9 which now consists of two parts. The length 1 of this intermediate part 39 determines the minimum distance apart $a_1$ and the maximum distance apart $a_2$ of the two plastic shaped parts 41 against which the frames 31 of the eyeglasses 25 rest. The intermediate part 39 can be a tube, the inside diameter of which is somewhat smaller than the outside diameter of the wire in the section 9 and holds the latter clamped. It is also possible to develop the intermediate part 39 as a threaded sleeve and provide a corresponding thread (not shown) on the two sections 9. In this way, the width a of the eyeglass holder 1 can be adjusted and readjusted at any time. Instead of the plastic shaped parts 41 being fastened by the bent wire 3 and the sleeves 23 consisting of a tubular material which are placed over them as shown in FIGS. 1 to 4, they can be fastened to the arms 11. The plastic shaped parts 41 have concave inner surfaces 43 against which the frame 31 of the eyeglasses 25 is intended to rest.

The eyeglass holder 1 is inserted into the open-top breast pocket of an article of clothing before the insertion of the eyeglasses 25, the clip 5 coming to rest on the outside of the pocket and the other parts of the holder 1 within the pocket. By the plastic shaped parts 21 which lie at a right angle to the surface of the material of the breast pocket, the breast pocket is widened and eyeglasses 25 can be inserted from above between the two plastic shaped parts 21, 41, formed by the two sleeves or tubes 23 which are held taut by the front arms 11 and the two clamping arms 15 or the concave inner surfaces 43 of the plastic shaped parts 41. The outwardly inclined uppermost regions 17 of the clamping arm 15 permit easy one-handed introduction of the eyeglasses 25. Upon the introduction of the eyeglasses 25, the two sleeves 23 or the plastic shaped parts 41 are stretched elastically outward (see regions 27 and 29 of FIG. 4). Not only are the sleeves 23 stretched but, in particular, the two parts formed by the front arm 11 and the clamping arms 15 are also forced outward. Only the frame 31 of the eyeglasses 25 comes into contact with the plastic shaped parts 21, 41; the lenses 33 remain at all times out of contact with the cloth of the breast pocket or sports jacket forming the pocket.

Depending on its nature, i.e. the resistance to abrasion of the surface of the sleeve 23 or the plastic shaped parts 41, the eyeglasses 25 can be inserted with greater or lesser resistance and are held fast primarily by the clamping force of the clamping arm 15.

Figure 8:
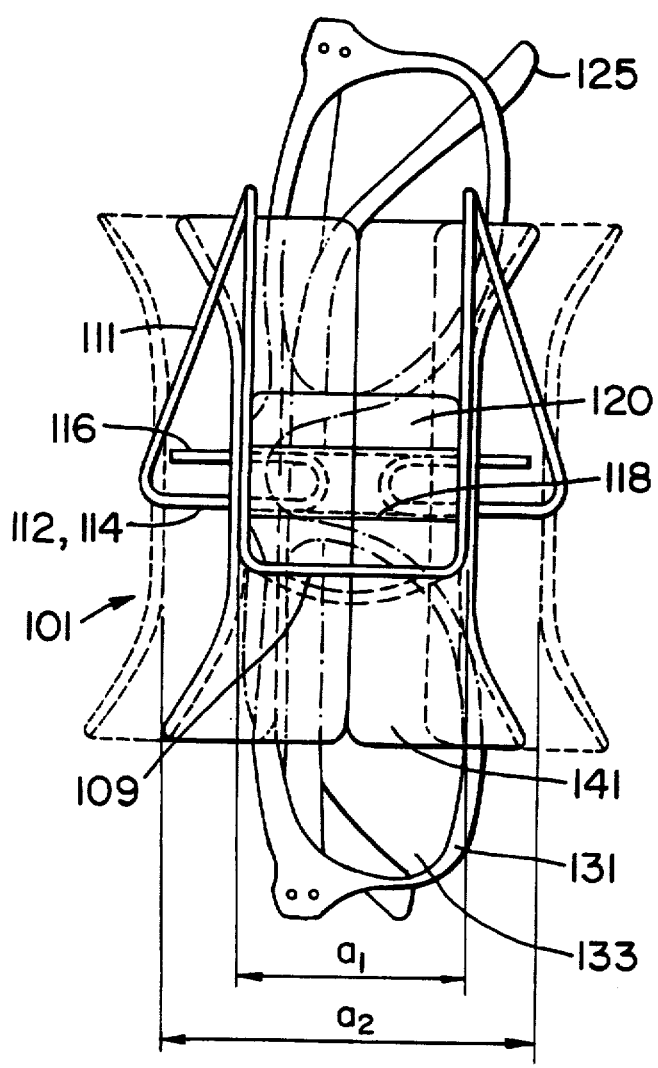
FIG. 8 is a front view of another adjustable eyeglass holder with eyeglasses inserted therein.
Figure 9:
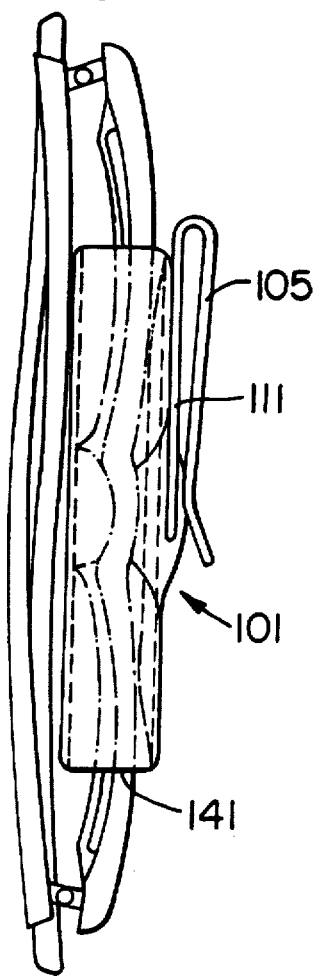
FIG. 9 is a side view of the eyeglass holder of FIG. 8.
Figure 10:
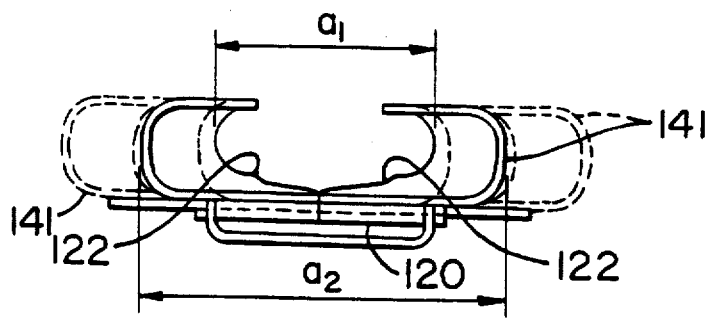
FIG. 10 is a top view of the eyeglass holder of FIG. 8 (without eyeglasses)

In the third embodiment of the invention, shown in FIGS. 8 to 10, the plastic shaped parts 141 are no longer placed lengthwise over the vertically extending front arms 111, but they are held by ends 112 of the clip 105, which ends are bent off substantially at a right angle. The bent ends 112 are developed in U-shape and have a lower arm 114 and an upper arm 116, which, in untensioned condition, lie slightly in V-shape. The bent U-shaped ends 112 are each inserted into a slot-shaped recess or opening 118 in the shaped parts 141. The height h of the recesses 118 is slightly less than the width of the untensioned U-shaped ends 119, so that a friction-locked fastening of the shaped parts 141 to the ends 112 is produced.

The recess 118 is preferably arranged in the center of the shaped parts 141 which are preferably of mirror symmetry. This permits the use of two identical shaped parts 141.

The clip 105, which connects the two front arms 111 to each other can, as shown in FIGS. 1 to 4, be of V-shape, or else they may have a straight or bent lower section (shown in dashed line in FIG. 8).

In order to keep the wall thicknesses and thus also the weight of the shaped parts 141 slight, the recesses 118 can be provided in beads 120 arranged on the surface of the shaped parts 141.

Figure 11:
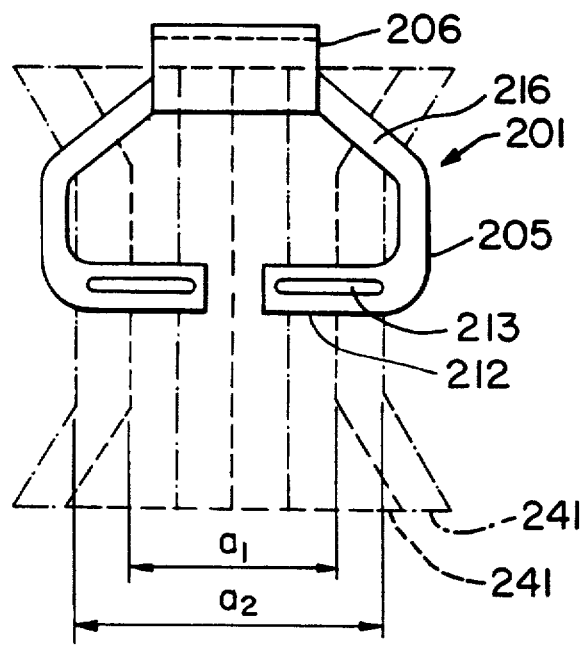
FIG. 11 is a view of a fourth embodiment of the eyeglass holder made of plastic.
Figure 12:
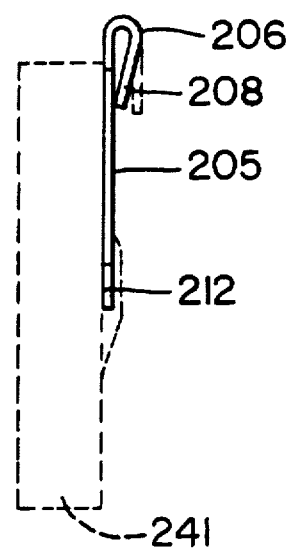
FIG. 12 is a side view of the eyeglass holder of FIG. 11.

In the fourth embodiment of the invention, shown in FIGS. 11 and 12, the clip 205 of the holder 201 is made of plastic. The two ends 212 which receive the plastic shaped parts 241 extend inward substantially at a right angle from the U-shaped clip 205 and are provided with slots 213 which hold the plastic shaped parts 241 which are placed onto the ends 212 fast in such a manner that, if necessary, they can be shifted and their distance apart thus adapted to the size of the eyeglasses. The slots 213 can be open or, as shown in FIG. 11, they can be closed on the side. The shaped parts 241 shown in dash-dot line are at the greatest possible distance apart, and those shown in dashed lines are at the smallest possible distance apart.

In order to hold the eyeglass holder 201 fast on an article of clothing, a spring lock 206 is formed on the upper arm 216 of the clip 205, this lock having a holding part 208 which is developed in one piece with the clip 205 and rests under spring tension in the closed position against the arm 216 of the clip 205. The manner of operation of such holding parts, such as also used on ballpoint pens, is well known from actual practice.

Figure 13:
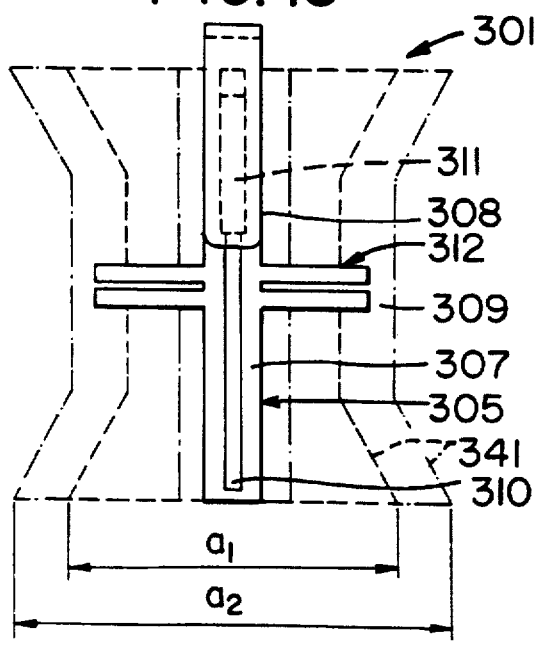
FIG. 13 is a view of a fifth embodiment of the eyeglass holder, made of plastic.
Figures 14, 15:
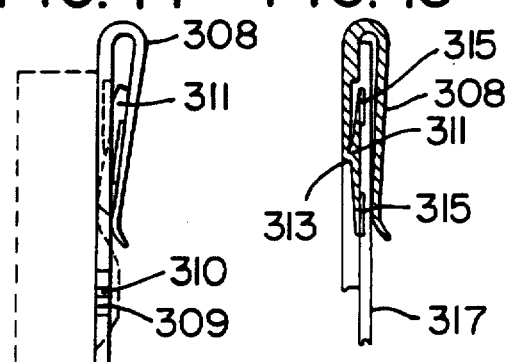
FIG. 14 is a side view of the eyeglass holder of FIG. 11.
FIG. 15 is an enlarged longitudinal section through the holding part of the eyeglass holder of FIG. 14.

In the fifth embodiment of the invention, shown in FIGS. 13 to 15, the clip 305 consists of a cross-shaped structure, the two beams 307, 309 of which have longitudinally extending slots 310. The slots 310 serve to increase the elasticity of the clip 305 and to hold fast the plastic shaped parts 341 placed on the two arms/ends 312.

The holder 301 or clip 305 which bears the two shaped parts 341, bears at the upper end of the vertical beam a tab-shaped holding part 308 developed with spring elasticity, its free end resting against the beam 307. A rocker 311 is arranged on the beam 307, concealed by the holding part 308. The rocker 311 is connected on its rear by a narrow elastic web 313 with the beam 307 and has two preferably grooved resting feet 315 which are intended and developed so as to rest uniformly against the rear of the holding part 308, regardless of the position of said part. The holding part 308 can be made in one piece with the clip 305 or be connected as separate metal part to the beam 307.

Upon the insertion of eyeglasses between the two plastic shaped parts 341, the beam 307 of the clip 305 is spread, i.e. the slot 310 is widened. As a result of the spring properties of the plastic of the clip 305 and/or of the beam 307, the inserted eyeglasses are firmly held.

Upon insertion of the holder 301 into the breast pocket 317 of a shirt or work clothing, the holding part 308 is bent outward and comes to lie on the outside of the breast pocket. The two feet 315 of the rocker 311 lie on the inside of the breast pocket 317 and press it firmly against the holding part 308. Due to the double application of the two feet 315, the eyeglass holder 301 is held firmly in vertical position in the breast pocket 317.

Regions on which advertising imprints can be provided can be arranged on the holding parts 208 and 308.

The shaped parts 41, 141, 241, 341 can have on the inside steps 122 for the resting of the frame 31, 131 of the eyeglasses 25, 125, said steps excluding direct contact between the lenses 33, 133 and the shaped parts 41, 141 and thereby preventing scratching of the lenses 133.

By the pushing of the shaped parts 141, 231, 341 onto the ends 112, 221, 312, the eyeglass holder 101, 201, 301 can be adapted with infinite variability at all times to the size Of the eyeglasses 125 to be placed therein.

In addition, tubular, annular or strap-shaped receiving devices 35 for the insertion of a writing instrument 37 can be arranged on one or both plastic shaped parts.

I claim:

1. A holder for eyeglasses comprising a receiver for receiving the eyeglasses, a clip for fastening the receiver and for clamping the holder to an article of clothing or a carrying bag or other object, the receiver comprises two opposite plastic shaped parts which are formed elastically and held by elastic spring action connected to the clip, for laterally clamping a frame of the eyeglasses, the clip is formed by a wire of spring steel or a spring-elastic material, the wire, in the region of the plastic shaped parts, comprising two substantially parallel arms, and the plastic shaped parts comprising a material which bridges over the two arms.

2. A holder according to claim 1, wherein the two plastic shaped parts are of symmetrical development.

3. A holder according to claim 1, wherein a sheet-shaped material comprises a sleeve or tube of a woven knitted or extruded sheet-shaped structure, and the sleeve is placed over a front of said two arms and the other of said two arms comprising a clamping arm, forming the plastic shaped parts.

4. A holder according to claim 1, further comprising an intermediate part in which ends of the wire of said clip are displaceably disposed wherein distance apart of the plastic shaped parts is adjustable by said intermediate part.

5. A holder according to claim 1, further comprising a threaded intermediate part engaging ends of the wire of said clip, wherein distance apart of the plastic shaped parts is adjustable by turning said intermediate part.

6. A holder for eyeglasses comprising a receiver for receiving the eyeglasses, a clip for fastening the receiver and for clamping the holder to an article of clothing or a carrying bag or other object, the receiver comprises two opposite plastic shaped parts which are formed elastically and held by elastic spring action connected to the clip, for laterally clamping a frame of the eyeglasses, the clip comprises a substantially U-shaped body of plastic having downward-extending arms of which, ends are directed inward at a right angle and having an upper base part, and a holding part is fastened on said upper base part and is spring tensioned against said upper base part.

7. A holder for eyeglasses comprising a receiver for receiving the eyeglasses, a clip for fastening the receiver and for clamping the holder to an article of clothing or a carrying bag or other object, the receiver comprises two opposite plastic shaped parts which are formed elastically and held by elastic spring action connected to the clip, for laterally clamping a frame of the eyeglasses, and the clip comprises a plastic structure developed in cross-shape, a horizontal beam of which forms two ends bearing the plastic shaped parts and a vertical beam of which bears a holding part on its upper end.

8. A holder according to claim 7, wherein a rocker which is directed against the holding part is fastened, swingable around a web, on the vertical beam.

9. A holder according to claim 8, wherein feet for application against the holding part are arranged on ends of the rocker.

10. A holder for eyeglasses comprising a receiver for receiving the eyeglasses, a clip for fastening the receiver and for clamping the holder to an article of clothing or a carrying bag or other object, the receiver comprises two opposite plastic shaped parts which are formed elastically and held by elastic spring action connected to the clip, for laterally clamping a frame of the eyeglasses, and a tubular, annular or strap-shaped means for receiving a writing instrument is arranged on at least one of the plastic shaped parts.

11. A holder for eyeglasses comprising a receiver for receiving the eyeglasses, a clip for fastening the receiver and for clamping the holder to an article of clothing or a carrying bag or other object, the receiver comprises two laterally-aligned spaced plastic shaped parts which are formed elastically and held by elastic spring action and connected to the clip, for laterally clamping longitudinal edges of a frame of the eyeglasses, and the clip is formed by a spring-elastic material.

12. A holder according to claim 11, wherein said spring-elastic material is plastic.

13. A holder according to claim 12, wherein said spring-elastic material forms front arms with bent-off ends respectively displaceably mounted in said two plastic shaped parts, whereby distance apart of the plastic shaped parts is adjustable by displacing the two plastic shaped parts on the bent-off ends.

14. A holder according to claim 11, wherein the two plastic shaped parts are of symmetrical development.

15. A holder according to claim 11, wherein said spring-elastic material is wire.

16. A holder according to claim 15, wherein said wire is made of spring steel.

17. A holder according to claim 15, wherein the two plastic shaped parts are of symmetrical development.

* * * * *

UNITED STATES PATENT AND TRADEMARK OFFICE
CERTIFICATE OF CORRECTION

PATENT NO. : 5,491,878
DATED      : Feb. 20, 1996
INVENTOR(S) : Heinz Janouschek It is certified that error appears in the above-identified patent and that said Letters Patent is hereby corrected as shown below:

On the cover page, left-hand column line 5, after this line insert:

--[22] PCT Filed:    Nov. 25, 1993

[86] PCT No.:      PCT/CH93/00268

§ 371 Date:   July 25, 1994

§ 102(e) Date: July 25, 1994

[87] PCT Pub. No.: WO94/12073

PCT Pub. Date: June 9, 1994 --

Signed and Sealed this

Seventh Day of October, 1997

Attest:

BRUCE LEHMAN

Attesting Officer        Commissioner of Patents and Trademarks